(12) United States Patent
Bailey et al.

(10) Patent No.: US 8,103,712 B2
(45) Date of Patent: Jan. 24, 2012

(54) METHOD FOR PERFORMING A DIVISION OPERATION IN A SYSTEM

(75) Inventors: James Ray Bailey, Georgetown, KY (US); Zachary Nathan Fister, Lexington, KY (US); Jimmy Daniel Moore, Jr., Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 1151 days.

(21) Appl. No.: 11/863,711

(22) Filed: Sep. 28, 2007

(65) Prior Publication Data

US 2009/0089346 A1 Apr. 2, 2009

(51) Int. Cl.
*G06F 7/535* (2006.01)
(52) U.S. Cl. ......................................................... 708/653
(58) Field of Classification Search .................. None
See application file for complete search history.

(56) References Cited

U.S. PATENT DOCUMENTS

| | | | | |
|---|---|---|---|---|
| 7,487,197 B2* | 2/2009 | Clark et al. | .................... | 708/650 |
| 7,738,657 B2* | 6/2010 | Gopal et al. | ..................... | 380/28 |
| 2002/0016808 A1* | 2/2002 | Pelton et al. | .................. | 708/653 |
| 2004/0230635 A1* | 11/2004 | Ebergen et al. | ............... | 708/653 |
| 2010/0281087 A1* | 11/2010 | Powell | ........................... | 708/209 |

* cited by examiner

*Primary Examiner* — David H Malzahn (57) ABSTRACT

A method for performing a division operation in a system includes a) determining an approximate quotient of a numerator value and a denominator value; b) determining an initial error of the approximate quotient; c) determining a quotient adjustment value based on the initial error; d) determining whether to apply the quotient adjustment value to the approximate quotient; e) if the determination at d) is YES, then applying the quotient adjustment value to the approximate quotient; f) determining an iterative error of the approximate quotient; g) updating the quotient adjustment value based on the iterative error; h) repeating acts d) through g) until the determination at d) is NO, thereby determining a final value for the approximate quotient; i) generating an integer quotient based on the final value of the approximate quotient; and j) using the integer quotient with regard to at least one aspect of the system.

18 Claims, 7 Drawing Sheets

METHOD FOR PERFORMING A DIVISION OPERATION IN A SYSTEM

CROSS-REFERENCE TO RELATED APPLICATIONS

None.

MICROFICHE APPENDIX

None.

GOVERNMENT RIGHTS IN PATENT

None.

BACKGROUND OF THE INVENTION

1. Field of the Invention

The present invention relates to a method for performing a division operation in a system, and, more particularly, to a method for performing a division operation in a system having a processor that does not have a native division function.

2. Description of the Related Art

Electronic systems, such as for example, those utilizing embedded scanning, image processing, and printing algorithms, commonly use mathematical functions, such as division. As specific examples, division operations are commonly used for calculating averages in scanner calibration algorithms, printhead dot count calculations, and printhead carrier velocity determinations.

Existing division algorithms for digital designs generally fall into two categories: slow division and fast division. Slow division algorithms, such as restoring, non-restoring, and SRT (Sweeney, Robertson and Tocher) division, produce one digit of the final quotient per iteration. With a slow algorithm, calculating a 32-bit quotient always requires 32 iterations. Fast division algorithms, such as Newton-Raphson and Goldschmidt division, approach the final quotient quadratically, with more quotient bits calculated for each iteration. With a fast algorithm, calculating a 32-bit quotient may require 6 or less iterations.

The tradeoff with performance is complexity. Slow division algorithms can typically be implemented with less complex logic than a faster algorithm. Slow algorithms require simple shift and subtract operations for each iteration, and can be implemented in hardware at a low gate cost.

In contrast, faster algorithms generally require more complex logic to achieve better performance. For example, the Newton Raphson method attempts to converge to the reciprocal of the divisor. Each iteration requires a multiply operation, a subtract operation, and a second multiply operation. The required size of the multipliers increases on successive iterations as the product size increases, so this type of implementation may quickly become impractical due to the increased gate cost or timing requirements of a large multiplier circuit. Convergence algorithms such as this often attempt to decrease the number of required iterations by obtaining a better initial approximation value from a Lookup Table (LUT), which consequently decreases the multiplier complexity. However, implementing these LUTs in a hardware design can significantly increase cost.

What is needed in the art is a division algorithm with a simpler hardware implementation than a typical fast algorithm, such as the Newton-Raphson method, and that offers better performance by requiring fewer iterations than a typical slow algorithm.

SUMMARY OF THE INVENTION

The invention, in one form thereof, is directed to a method for performing a division operation in a system. The method includes a) determining an approximate quotient of a numerator value and a denominator value; b) determining an initial error of the approximate quotient; c) determining a quotient adjustment value based on the initial error; d) determining whether to apply the quotient adjustment value to the approximate quotient; e) if the determination at d) is YES, then applying the quotient adjustment value to the approximate quotient; f) determining an iterative error of the approximate quotient; g) updating the quotient adjustment value based on the iterative error; h) repeating acts d) through g) until the determination at d) is NO, thereby determining a final value for the approximate quotient; i) generating an integer quotient based on the final value of the approximate quotient; and j) using the integer quotient with regard to at least one aspect of the system.

The invention, in another form thereof, is directed to a method for performing division in a system. The method includes a) converting a numerator value into a numerator binary fraction; b) converting a denominator value into a denominator binary fraction; c) expanding a precision of the numerator binary fraction by a predetermined amount to form an expanded numerator binary fraction; d) determining an approximate quotient of the expanded numerator binary fraction and the denominator binary fraction; e) determining an initial error of the approximate quotient; f) determining a quotient adjustment value based on the initial error; g) determining whether to apply the quotient adjustment value to the approximate quotient; h) if the determination at g) is YES, then applying the quotient adjustment value to the approximate quotient; i) determining an iterative error of the approximate quotient; j) updating the quotient adjustment value based on the iterative error; k) repeating acts g) through j) until the determination at g) is NO, thereby determining a final value for the approximate quotient; l) generating an integer quotient based on the final value of the approximate quotient; m) converting the integer quotient into a floating point quotient; and n) using the floating point quotient with regard to at least one aspect of the system.

The invention, in another form thereof, is directed to an imaging apparatus. The imaging apparatus includes a controller configured to receive image data. The controller executes program instructions for performing a manipulation of the image data by implementing a division operation including a) determining an approximate quotient of a numerator value and a denominator value; b) determining an initial error of the approximate quotient; c) determining a quotient adjustment value based on the initial error; d) determining whether to apply the quotient adjustment value to the approximate quotient; e) if the determination at d) is YES, then applying the quotient adjustment value to the approximate quotient; f) determining an iterative error of the approximate quotient; g) updating the quotient adjustment value based on the iterative error; h) repeating acts d) through g) until the determination at d) is NO, thereby determining a final value for the approximate quotient; and i) generating an integer quotient based on the final value of the approximate quotient.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
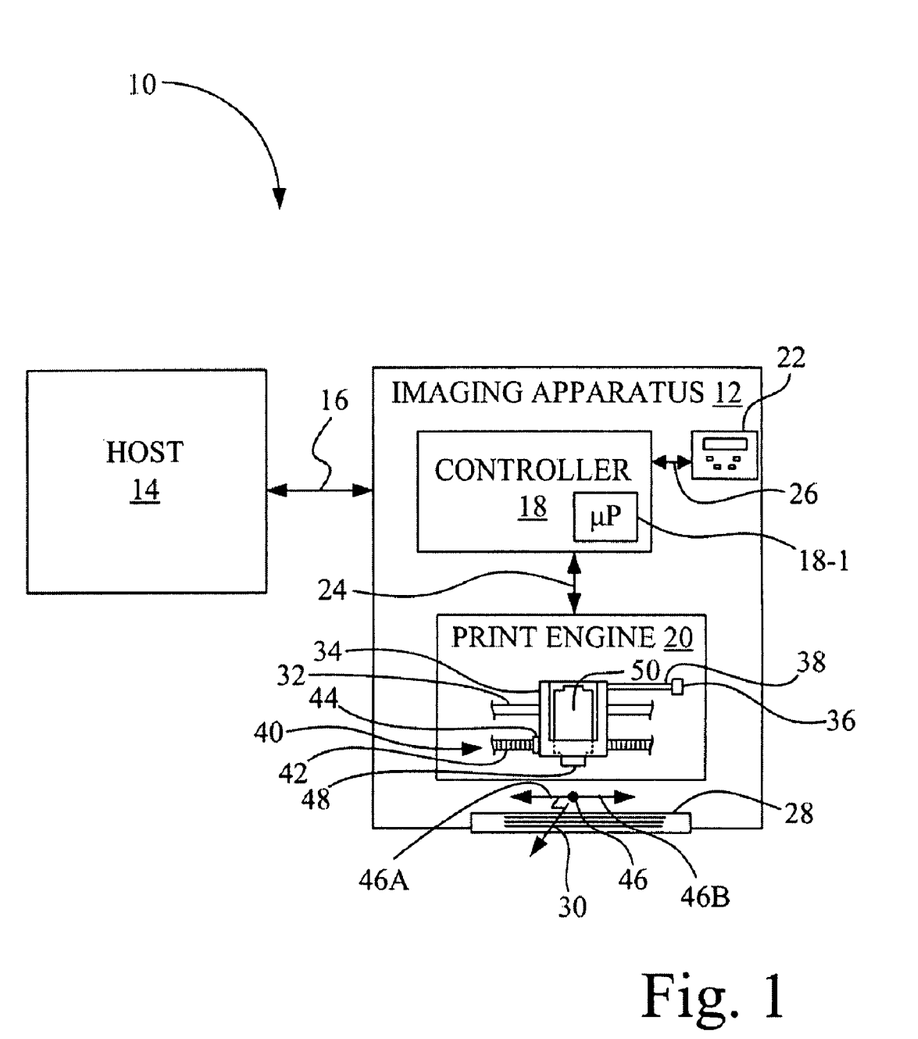
FIG. 1 is a diagrammatic depiction of an exemplary system embodying the present invention.

Referring to FIG. 1, there is shown a diagrammatic depiction of an exemplary system 10 embodying the present invention. System 10 may be, for example, an imaging system that includes imaging apparatus 12, and optionally, a host 14.

In embodiments that include host 14, imaging apparatus 12 may communicate with host 14 over a communication link 16. As used herein, the term "communications link" is used to generally refer to structure that facilitates electronic communication between multiple components, and may operate using wired or wireless technology. Imaging apparatus 12 may communicate with host 14 via a standard communication protocol, such as for example, universal serial bus (USB), Ethernet or IEEE 802.1x, etc.

As used herein, the term "imaging apparatus" is a device that forms a printed image on a print medium. In the embodiment shown in FIG. 1, imaging apparatus 12 is shown as an ink jet printer that includes a controller 18, a print engine 20 and a user interface 22. Alternatively, imaging apparatus 12 may be a standalone unit that is optionally communicatively linked to a host, such as host 14. For example, imaging apparatus 12 may take the form of an all-in-one, i.e., multifunction, machine that includes a scanner to facilitate standalone copying and facsimile capabilities, in addition to optionally serving as a printer when attached to a host, such as host 14.

Host 14 may be, for example, a personal computer including an input/output (I/O) device, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 may include in its memory a software program including program instructions that function as an imaging driver, e.g., printer driver software, for imaging apparatus 12. Alternatively, the imaging driver may be incorporated, in whole or in part, in imaging apparatus 12.

Controller 18 of imaging apparatus 12 includes an embedded processor 18-1, e.g., a microprocessor (μP) and associated memory (not shown), and may be formed as an Application Specific Integrated Circuit (ASIC). Controller 18 communicates with print engine 20 by way of a communications link 24. Controller 18 communicates with user interface 22 by way of a communications link 26. Communications links 24 and 26 may be established, for example, by using standard electrical cabling or bus structures, or by wireless connection.

In the present embodiment, print engine 20 of imaging apparatus 12 is an ink jet print engine configured for forming an image on a sheet of print media 28, such as a sheet of paper, transparency or fabric that is transported in a sheet feed direction 30.

Print engine 20 may include, for example, a guide frame 32, a reciprocating printhead carrier 34, a drive motor 36, a drive belt 38, and a carrier position encoder 40. Carrier position encoder 40 includes a linear encoder strip 42 and an encoder sensor 44. Printhead carrier 34 is slidably coupled to guide frame 32. Drive belt 38 is connected to printhead carrier 34, and is driven by drive motor 36 operating under the control of controller 18.

Guide frame 32 defines a bi-directional main scan path 46, including direction 46A and direction 46B. During a printing operation, guide frame 32 guides printhead carrier 34 back and forth along bi-directional main scan path 46, with drive motor 36 and drive belt 38 providing the motive force to move printhead carrier 34. Encoder sensor 44 of carrier position encoder 40 is communicatively coupled to controller 18, and reads linear encoder strip 42 as printhead carrier 34 is moved so as to provide carrier position data to controller 18 corresponding to a relative linear position of printhead carrier 34 along bi-directional main scan path 46. Bi-directional main scan path 46 is perpendicular to sheet feed direction 30.

Printhead carrier 34 is mechanically and electrically configured to mount and carry at least one printhead 48. Each printhead 48 is in fluid communication with at least one ink tank 50. In one embodiment, for example, printhead 48 and ink tank 50 and may be formed as an integral printhead cartridge, so as to be replaceable as a non-separable unit. In another embodiment, printhead 48 and ink tank 50 may be designed to be separable, so as to be individually replaceable, with printhead 48 being semi-permanently mounted to printhead carrier 34 (i.e., usable with multiple replaceable ink tanks 50), and with each ink tank 50 being replaceably coupled to printhead carrier 34 and printhead 48. In either embodiment, during a printing operation printhead carrier 34 transports printhead 48 in a reciprocating manner over an image surface of the sheet of print media 28.

Controller 18 also processes image data, which may be supplied by an external device, such as host 14. For example, controller 18 processes print commands and manipulates the image data for printing. Based on print commands and image data, controller 18 controls the reciprocation of printhead carrier 34 and controls printhead 48 to selectively eject ink to form an image on the sheet of print media 28.

In the present embodiment, embedded processor 18-1 is a processor having limited native functions (i.e., native predefined instructions for performing predefined tasks). In particular, embedded processor 18-1 does not include a native division function. However, those skilled in the art will recognize that division functionality is needed, for example, in order to calculate values for system tasks, such as for example, image data manipulation, velocity determinations (such as printhead carrier velocity), calculating averages in scanner calibration algorithms, performing printhead dot count calculations and ink usage determinations, etc.

In accordance with the present invention, a method is provided that may be used for performing a division operation, such as with embedded processor 18-1, to generate values used with regard to at least one aspect of system 10. Aspects of system 10 may include, for example: generating preliminary data, which may be used for other mathematical operations; generating data to control pixels displayed on a display (e.g., on user interface 22); the mathematical manipulation of image data (e.g., calculating halftone data from continuous tone data); calculating a velocity (distance/time), such as a velocity of printhead carrier 34 that may be used in printhead carrier velocity control; performing printhead dot count calculations and ink usage determinations for printhead 48 and/or ink tank 50; calculating averages in scanner calibration algorithms (in embodiments where system 10 includes a scanner); etc.

While the embodiment of system 10 is an imaging system that includes imaging apparatus 12 in the form of an ink jet printer, those skilled in the art will recognize that the principles of the invention may be applied to other types of systems, such as systems that use other types of printing technology, such as for example electrophotographic (e.g., laser) printing technology.

Figure 2A:
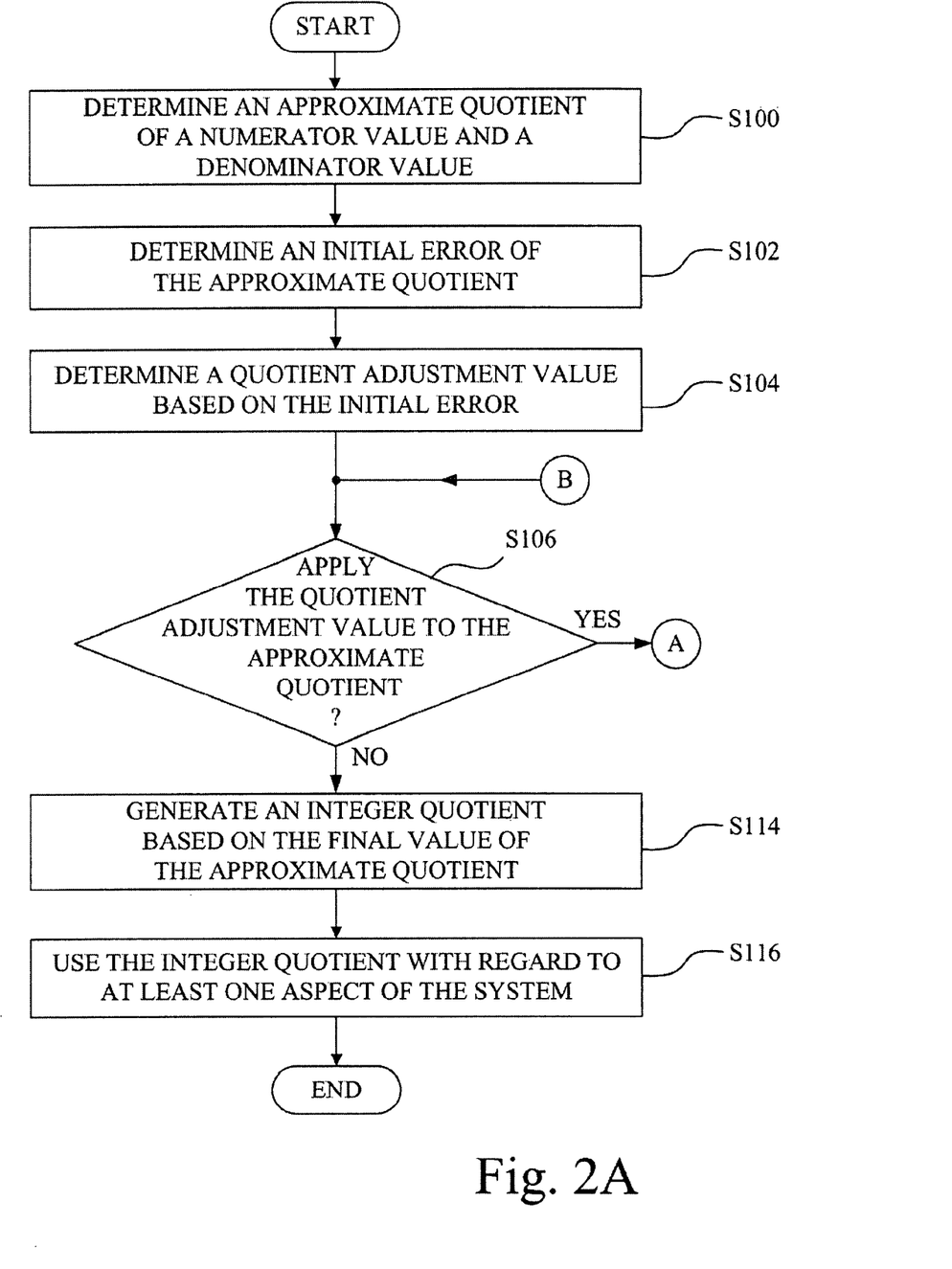
FIGS. 2A and 2B form a flowchart of a method for performing integer division, in accordance with an aspect of the present invention.
Figure 2B:
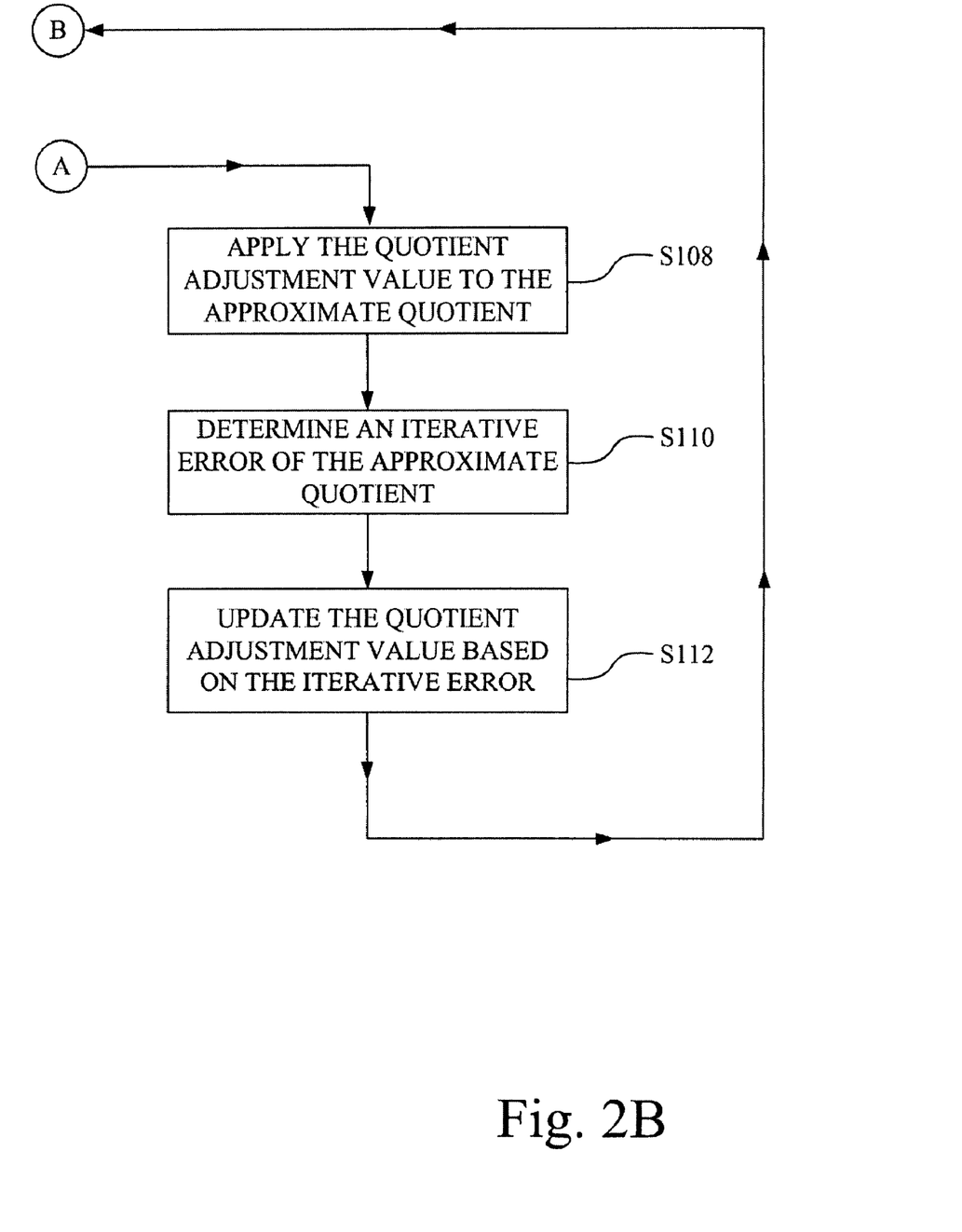

FIGS. 2A and 2B form a flowchart of a method for performing division, e.g., integer division, in a system, such as system 10 utilizing embedded processor 18-1 that does not have a native division function, in accordance with an aspect of the present invention.

At act S100, an approximate quotient of a numerator value and a denominator value is determined. Equation 1, as follows, may be used to calculate an initial approximation of the approximate quotient (DivApprox):

$$DivApprox = \frac{Num}{2^{DenMSB}} \qquad \text{Equation 1}$$

Equation 1 may be implemented as a logical shift right of the numerator (Num), by the denominator (Den) most significant bits (DenMSB).

Preliminary to performing act S100, a negative numerator or negative denominator input is converted to its absolute value so that Equation 1 works on positive operands. The sign of the inputs are registered and is considered again after the iterative portion of the current method is complete.

The most significant nonzero bit location in the denominator, DenMSB, is found, such as by using combinational logic. DenMSB is useful in selecting a multiplier input and calculating the initial approximate quotient. A selection is made as to which input of the multiplier is used for the approximate quotient, DivApprox, and which is used for the denominator, Den.

For example, assume a 16-bit×32-bit multiplier. Using a simple shift circuit, DenMSB is shifted right by 4 bits. If the result equals zero, then Den only requires the 16-bit input and DivApprox requires the 32-bit input. However, if the result of the shift is one, then the inputs are switched. By not requiring a 32-bit×32-bit multiplier, the gate cost for the multiplier circuit is significantly reduced. Those skilled in the art will recognize that the multiplier may be scaled to facilitate the desired number of bits in the quotient.

At act S102, an initial error of the approximate quotient, DivApprox, is determined. Equation 2, as follows, may be used to determine the initial error (Error) for the approximate quotient, DivApprox, as follows:

$$\text{Error} = (\text{DivApprox} \times \text{Den}) - \text{Num} \qquad \text{Equation 2:}$$

Note that DivApprox may be an underestimation of the actual value, so Error may be negative.

Referring to Equation 3, a new value, ErrorNeg, equals 1 if Error is negative. Otherwise, the new value, ErrorNeg, equals 0:

$$(\text{Error}<0) \Rightarrow \text{ErrorNeg}=1$$

$$(\text{Error}>0) \Rightarrow \text{ErrorNeg}=0 \qquad \text{Equation 3:}$$

Referring to Equation 4, the absolute value of the error (Error), ErrorAbs, is also calculated for use in subsequent comparisons:

$$\text{ErrorAbs} = |\text{Error}| \qquad \text{Equation 4:}$$

At act S104, a quotient adjustment value, DivAdj, is determined based on the initial error (Error). Equation 5, as follows, may be used to calculate the quotient adjustment value, DivAdj, for the first iteration:

$$DivAdj = \frac{\frac{\text{Error}}{2^{DenMSB}}}{2} \qquad \text{Equation 5}$$

Equation 5 may be implemented, for example, in hardware by a series of logical shift circuits. First, Error is shifted right by DenMSB bits. Next, this result is shifted right by 1 bit.

At act S106, it is determined whether the quotient adjustment value needs to be applied to the approximate quotient. Equation 6, as follows, may be used in making this determination:

$$\text{ErrorAbs} \geq \text{Den} \qquad \text{Equation 6:}$$

Satisfying the condition of Equation 6 indicates that the denominator Den may be divided into the numerator Num even further, so the iterations should continue. Thus, if the determination at act S106 is YES, then the process proceeds to act S108.

Figure 3:
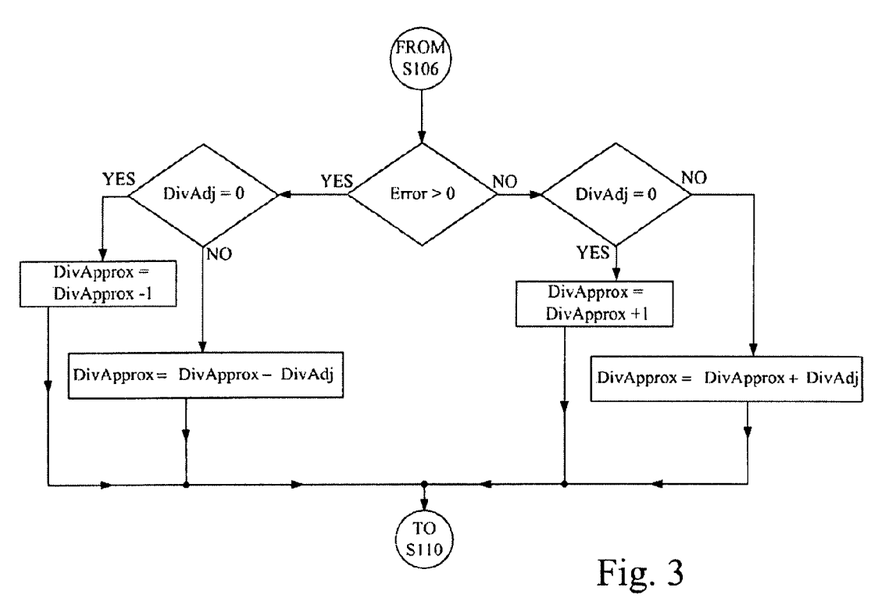
FIG. 3 is a flowchart of an exemplary subroutine for performing act S108 of the method of FIGS. 2A and 2B.

At act S108, the quotient adjustment value DivAdj is applied to the approximate quotient DivApprox. FIG. 3 is a flowchart of an exemplary subroutine for performing act S108.

If Error (Equation 2) is positive and quotient adjustment value DivAdj (Equation 5) is nonzero, the quotient adjustment value DivAdj is applied to the approximate quotient DivApprox and the new quotient value for approximate quotient DivApprox may be found, as set forth in Equation 7, as follows:

$$\text{DivApprox} = \text{DivApprox} - \text{DivAdj} \qquad \text{Equation 7:}$$

However, if Error is positive, but quotient adjustment value DivAdj is zero, the new quotient value for approximate quotient DivApprox may be found using Equation 8, as follows:

$$\text{DivApprox} = \text{DivApprox} - 1 \qquad \text{Equation 8:}$$

Equation 8 is used for later iterations when Error has decreased to a small amount and only fine adjustments are needed.

Conversely, if Error is negative and quotient adjustment value DivAdj is nonzero, the new quotient value for approximate quotient DivApprox may be found using Equation 9, as follows:

$$\text{DivApprox} = \text{DivApprox} + \text{DivAdj} \qquad \text{Equation 9:}$$

If Error is negative, but quotient adjustment value DivAdj is zero, the new quotient value for approximate quotient DivApprox may found by Equation 10, as follows:

$$\text{DivApprox} = \text{DivApprox} + 1 \qquad \text{Equation 10:}$$

Figure 4:
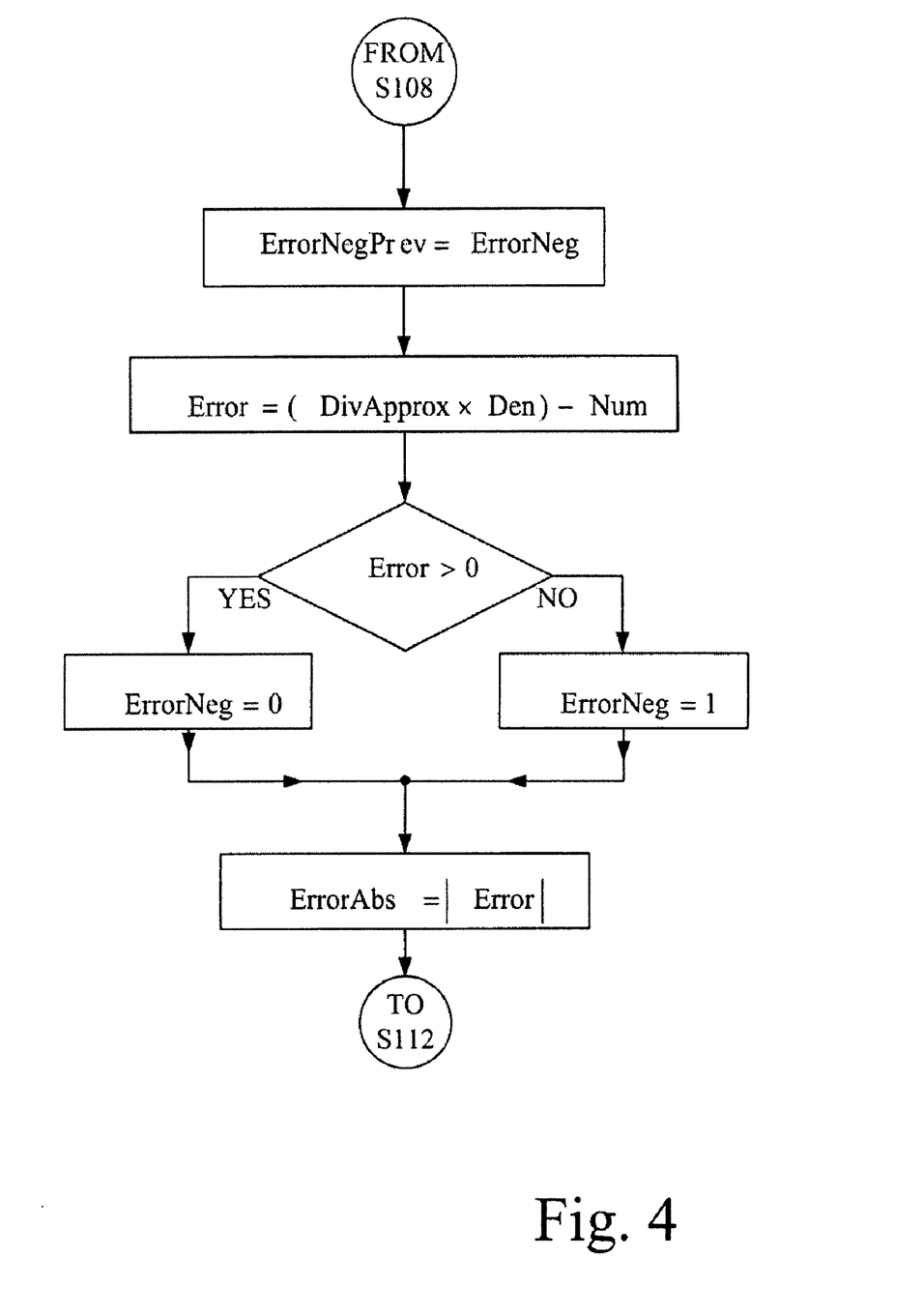
FIG. 4 is a flowchart of an exemplary subroutine for performing act S110 of the method of FIGS. 2A and 2B.

At act S110, an iterative error of the approximate quotient DivApprox is determined. FIG. 4 is a flowchart of an exemplary subroutine for performing act S110.

Referring to Equation 11, as follows, a new value, ErrorNegPrev stores the current value of ErrorNeg, wherein both are used in the determination of the new adjustment value for quotient adjustment value DivAdj.

ErrorNegPrev=ErrorNeg    Equation 11:

For the new approximate value for quotient adjustment value DivAdj, Error and ErrorAbs are calculated again as in Equations 2 and 4. ErrorNeg is now reassigned based on the new Error value. With the updated value in ErrorNeg and the previous value stored in ErrorNegPrev, the new adjustment value for quotient adjustment value DivAdj may be calculated for use in the next iteration.

Figure 5:
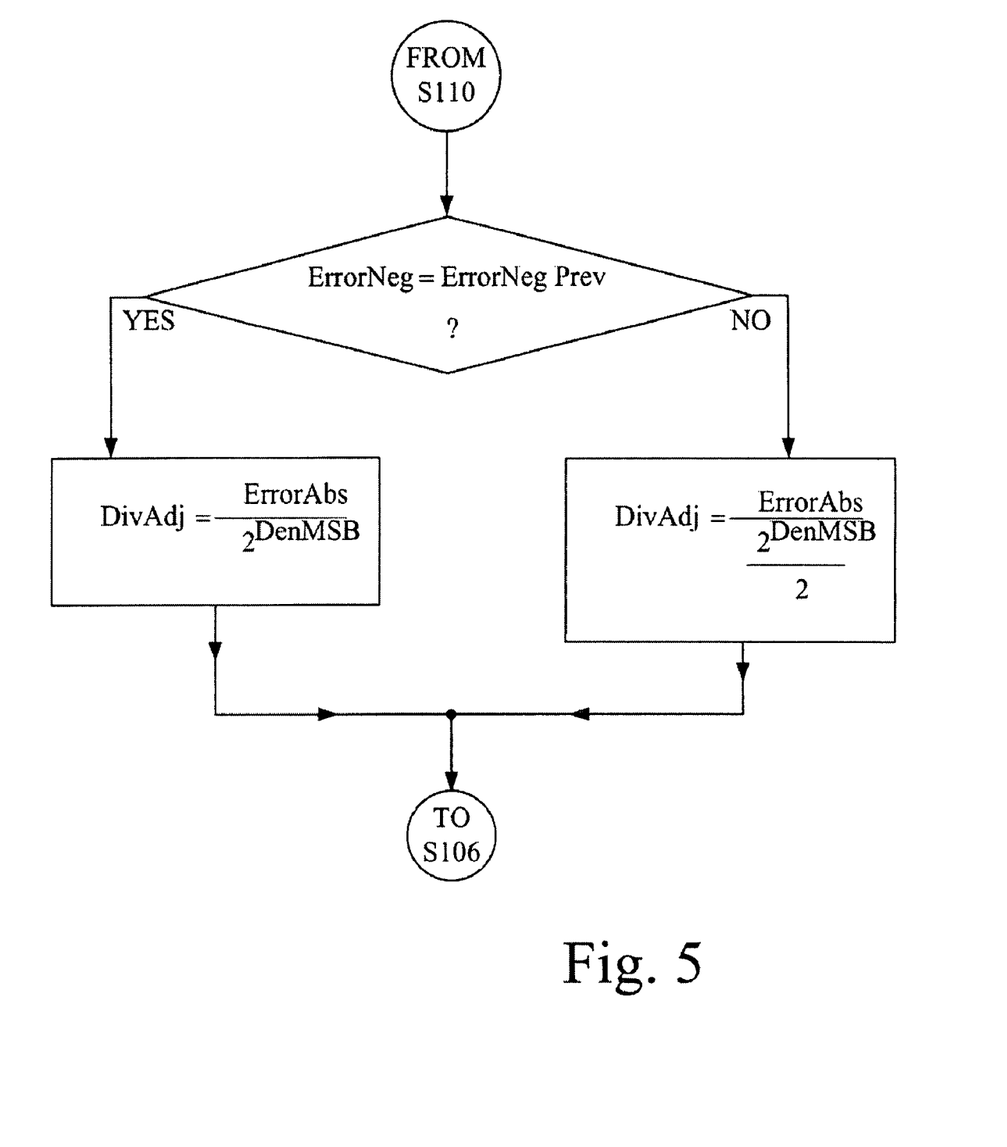
FIG. 5 is a flowchart of an exemplary subroutine for performing act S112 of the method of FIGS. 2A and 2B.

At act S112, the quotient adjustment value DivAdj is updated based on the iterative error, and the process returns to act S106. FIG. 5 is a flowchart of an exemplary subroutine for performing act S112.

If ErrorNeg does not equal ErrorNegPrev, then the quotient adjustment value DivAdj is calculated by Equation 12, as follows:

$$DivAdj = \frac{\text{Error Abs}}{\frac{2^{DenMSB}}{2}} \quad \text{Equation 12}$$

If ErrorNeg equals ErrorNegPrev, then the quotient adjustment value DivAdj is calculated by Equation 13, as follows:

$$DivAdj = \frac{\text{Error Abs}}{2^{DenMSB}} \quad \text{Equation 13}$$

Both adjustment calculations in Equations 12 and 13 may be implemented with simple shift circuits because they are divisions by powers of 2, and thus, very little additional circuitry is required to implement these adjustments. Equation 12 is identical to the initial adjustment value in Equation 13. Thus, the circuit for Equation 12 may be implemented by incorporating that of Equation 13, and performing one additional shift.

Analysis of the ErrorNeg value for all iterations of a division operation shows that it follows a repeating pattern of being set for two iterations, followed by being clear for two iterations, etc. Thus, the adjustment value always toggles between the two adjustments in Equations 12 and 13. Conceivably, these adjustments may be combined in a single iteration to reduce the total number of iterations.

Acts S106, S108, S110 and S112 are repeated until the determination at act S106 is NO, i.e., Equation 6 is not satisfied, thereby determining a final value for the approximate quotient DivApprox, and the process continues at act S114.

At act S114, an integer quotient is generated based on the final value of the approximate quotient DivApprox.

At the end of the iterative correction, there is the possibility of one bit of positive roundup error which can be easily detected if ErrorNeg equals zero and ErrorAbs is nonzero. In this case, DivApprox is decremented by 1, as set forth in Equation 14, as follows:

DivApprox=DivApprox−1, when ErrorNeg=0 and
 ErrorAbs>0    Equation 14:

The original sign of the operands are also considered. If the sign of the numerator Num does not equal the sign of the denominator Den, the two's complement of the approximate quotient DivApprox is calculated, as set forth in Equation 15, as follows:

DivApprox=−DivApprox    Equation 15:

DivApprox now contains the precise integer quotient (Quotient) for the input numerator (Num) and denominator (Den), as set forth in Equation 16, as follows:

Quotient=DivApprox    Equation 16:

At act S116, the process uses the integer quotient (Quotient) with regard to at least one aspect of system 10. For example, the integer quotient may be used in: generating preliminary data, which may be used for other mathematical operations; generating data to control pixels displayed on a display (e.g., on user interface 22); the mathematical manipulation of image data (e.g., calculating halftone data from continuous tone data); calculating a velocity (distance/time), such as a velocity of printhead carrier 34 that may be used in printhead carrier velocity control; performing printhead dot count calculations and ink usage determinations for printhead 48 and/or ink tank 50; calculating averages in scanner calibration algorithms (in embodiments where system 10 includes a scanner); etc.

The complete division calculation can be further understood by the following example:

Input:

Num=$2147483647_{10}$, Den=$8327_{10}$

Initial Error Calculation:

DenMSB=13 (determined from the most significant non-zero bit in Den)

$$DivApprox = \frac{Num}{2^{DenMSB}} = \frac{2147483647}{2^{13}} = 26143 \quad \text{Equation 1}$$

$$\begin{aligned}Error &= (DivApprox \times Den) - Num \\ &= (262143 \times 8327) - 2147483647 \\ &= 35381114\end{aligned} \quad \text{Equation 2}$$

$$ErrorNeg = 0 \quad \text{Equation 3}$$

$$\text{Error Abs} = |\text{Error}| = 35381114 \quad \text{Equation 4}$$

$$DivAdj = \frac{\text{Error}}{\frac{2^{DenMSB}}{2}} = \frac{35381114}{\frac{2^{13}}{2}} = 2159 \quad \text{Equation 5}$$

Iteration Condition Met?

(ErrorAbs>=Den)→(35381114>=8327)→Yes    Equation 6:

Correction Iteration 1:

(Error > 0, DivAdj ≠ 0)

$$\begin{aligned}DivApprox &= DivApprox - DivAdj \\ &= 262143 - 2159 \\ &= 259984\end{aligned} \quad \text{Equation 7}$$

$$ErrorNegPrev = ErrorNeg = 0 \quad \text{Equation 11}$$

$$\begin{aligned}Error &= (DivApprox \times Den) - Num \\ &= (259984 \times 8327) - 2147483647 \\ &= 17403121\end{aligned} \quad \text{Equation 2}$$

$$ErrorNeg = 0 \quad \text{Equation 3}$$

$$ErrorAbs = |\text{Error}| = 17403121 \quad \text{Equation 4}$$

$(ErrorNeg = ErrorNegPrev)$ $$DivAdj = \frac{ErrorAbs}{2^{DenMSB}} = \frac{17403121}{2^{13}} = 2124 \quad \text{Equation 13}$$

Iteration Condition Met?

(ErrorAbs>=Den)→(17403121>=8327)→Yes    Equation 6:

Correction Iteration 2:

$(\text{Error} < 0, \text{DivAdj} \neq 0)$ $$\begin{aligned}\text{DivApprox} &= \text{DivApprox} - \text{DivAdj} \\ &= 259984 - 2124 \\ &= 257860\end{aligned}$$ Equation 7

$\text{ErrorNegPrev} = \text{ErrorNeg} = 0$ Equation 11

$$\begin{aligned}\text{Error} &= (\text{DivApprox} \times \text{Den}) - \text{Num} \\ &= (257860 \times 8327) - 2147483647 \\ &= -283427\end{aligned}$$ Equation 2

$\text{ErrorNeg} = 1$ Equation 3

$\text{ErrorAbs} = |\text{Error}| = 283427$ Equation 4
$(\text{ErrorNeg} \neq \text{ErrorNegPrev})$ $\text{DivAdj} = \dfrac{\text{ErrorAbs}}{2^{\frac{\text{DenMSB}}{2}}} = \dfrac{283427}{2^{\frac{13}{2}}} = 17$ Equation 12

Iteration Condition Met?

$(\text{ErrorAbs} >= \text{Den}) \rightarrow (283427 >= 8327) \rightarrow \text{Yes}$ Equation 6:

Correction Iteration 3:

$(\text{Error} > 0, \text{DivAdj} \neq 0)$ $$\begin{aligned}\text{DivApprox} &= \text{DivApprox} + \text{DivAdj} \\ &= 257860 + 17 \\ &= 257877\end{aligned}$$ Equation 9

$\text{ErrorNegPrev} = \text{ErrorNeg} = 1$ Equation 11

$$\begin{aligned}\text{Error} &= (\text{DivApprox} \times \text{Den}) - \text{Num} \\ &= (257877 \times 8327) - 2147483647 \\ &= -141868\end{aligned}$$ Equation 2

$\text{ErrorNeg} = 1$ Equation 3

$\text{ErrorAbs} = |\text{Error}| = 141868$ Equation 4
$(\text{ErrorNeg} = \text{ErrorNegPrev})$ $\text{DivAdj} = \dfrac{\text{ErrorAbs}}{2^{\text{DenMSB}}} = \dfrac{141868}{2^{13}} = 17$ Equation 13

Iteration Condition Met?

$(\text{ErrorAbs} >= \text{Den}) \rightarrow (141868 >= 8327) \rightarrow \text{Yes}$ Equation 6:

Correction Iteration 4:

$(\text{Error} < 0, \text{DivAdj} \neq 0)$ $$\begin{aligned}\text{DivApprox} &= \text{DivApprox} + \text{DivAdj} \\ &= 257877 + 17 \\ &= 257894\end{aligned}$$ Equation 9

$\text{ErrorNegPrev} = \text{ErrorNeg} = 1$ Equation 11

$$\begin{aligned}\text{Error} &= (\text{DivApprox} \times \text{Den}) - \text{Num} \\ &= (257894 \times 8327) - 2147483647 \\ &= -309\end{aligned}$$ Equation 2

$\text{ErrorNeg} = 1$ Equation 3

$\text{ErrorAbs} = |\text{Error}| = 309$ Equation 4
$(\text{ErrorNeg} = \text{ErrorNegPrev})$ $\text{DivAdj} = \dfrac{\text{ErrorAbs}}{2^{\text{DenMSB}}} = \dfrac{309}{2^{13}} = 0$ Equation 13

Iteration Condition Met?

$(\text{ErrorAbs} >= \text{Den}) \rightarrow (309 >= 8327) \rightarrow \text{No}$ Equation 6:

Precise Integer Quotient:

Quotient = DivApprox = 257894 Equation 16:

The division operations listed in the equations above are by a power of 2, so they can be performed by simple bit shifting in hardware. The multiplication operation represents a significant portion of this hardware design implementation, such as in the ASIC of controller 18 (e.g., accessible by or a part of) processor 18-1. However, a good cost-performance tradeoff is achieved by using a single 16-bit×32-bit multiplier in multiple iterations to achieve the quotient result. As mentioned earlier, use of a larger 32-bit×32-bit multiplier may be avoided by carefully selecting the inputs to the multiplier for each operation. Those skilled in the art will recognize that the multiplier may be scaled to facilitate the desired number of bits in the quotient.

In addition to a hardware implantation, the present invention may be implemented in firmware as instructions performed by processor 18-1 incorporated in the ASIC of controller 18. A further extension of the method described above with respect to FIGS. 2A and 2B is to implement the precise integer division calculation algorithm into a customized microprocessor design such that a native integer division instruction would be provided. Again, because only simple operations are required, this unique algorithm could be implemented with minimal logic in a microprocessor hardware design. Although the example above described a specific implementation that is limited to 32-bit integer inputs, those skilled in the art will recognize that the basic algorithm may be extended to larger integers for use in such a microprocessor application.

Figure 6:
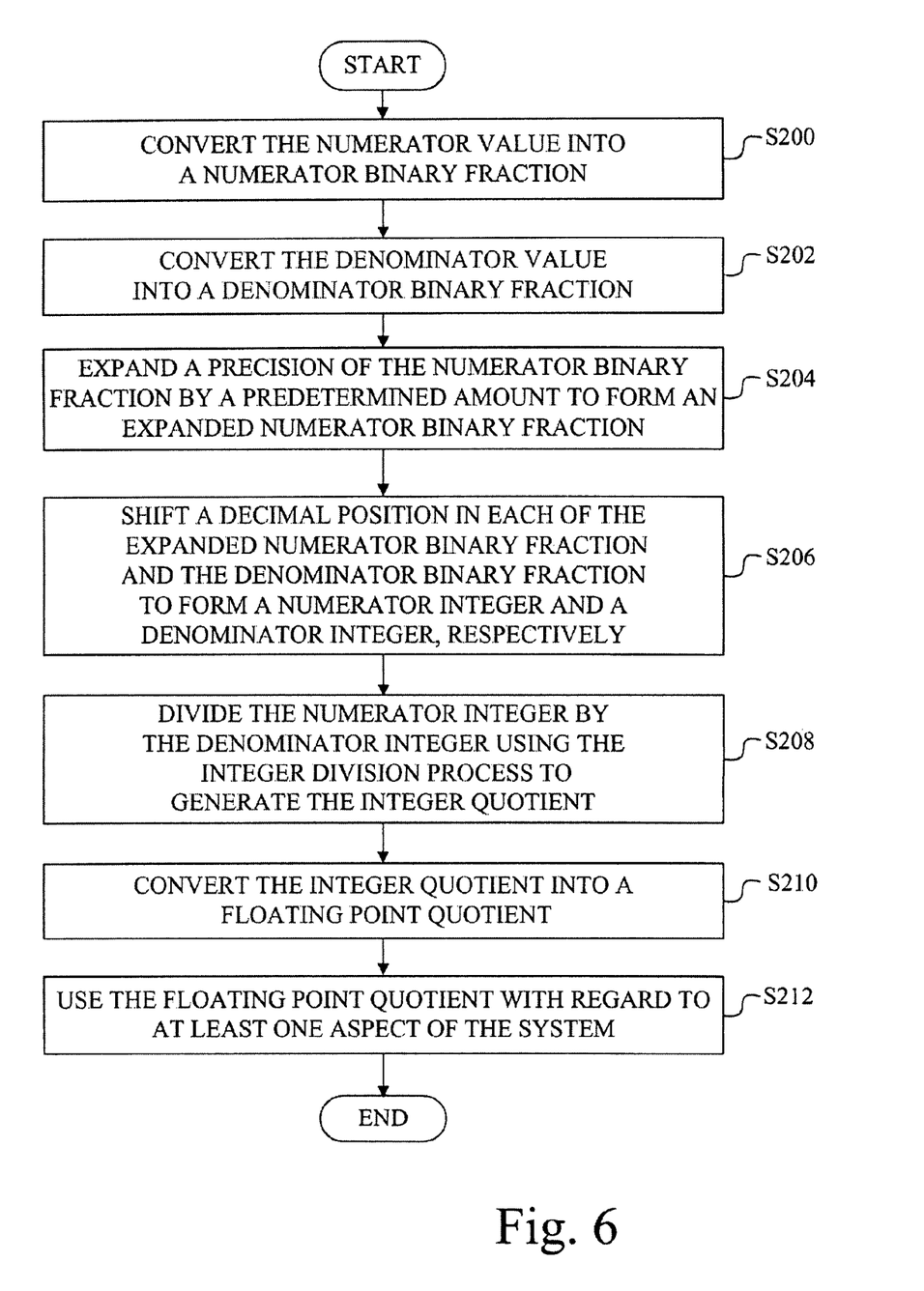
FIG. 6 is a flowchart of a method for performing a floating point division operation using the method of FIGS. 2A and 2B.

FIG. 6 is a flowchart of a method for performing a floating point division operation using the integer division method described above with respect to FIGS. 2A and 2B.

At act S200, the numerator (Num) value is converted into a numerator binary fraction. As an example, consider 100.8125 divided by 22.75. The numerator 100.8125 becomes 1100100.1101 (base 2).

At act S202, the denominator (Den) value is converted into a denominator binary fraction. In the present example, the denominator 22.75 becomes 10110.1100 (base 2).

At act S204, a precision of the numerator binary fraction is expanded by a predetermined amount to form an expanded numerator binary fraction. In this example, the numerator is expanded by 8 bits. Thus, 100.8125=1100100.1101 (base 2) is expanded by 8 to become 1100100.110100000000 (base 2).

At act S206, a decimal position in each of the expanded numerator binary fraction and the denominator binary fraction is shifted to form a numerator integer and a denominator integer, respectively. In the present example, the numerator (Num) becomes 110010011010000000 (base 2) and the denominator becomes 101101100 (base 2).

At act S208, the numerator integer is divided by the denominator integer using the integer division process of the method of FIGS. 2A and 2B to generate the integer quotient (Quotient). In the present example, 1100100110100000000÷101101100=10001101110 (base 2).

At act S210, the integer quotient (Quotient) is converted into a floating point quotient (FPQuotient). First, the integer quotient is converted into the binary fraction format. The expansion factor determines where the decimal is placed in the quotient binary fraction. In this example, the expansion factor was 8, so the decimal is placed 8 places from the right, thus forming quotient binary fraction, 100.01101110 (base 2). Those skilled in the art will recognize how to convert the quotient binary fraction into the floating point quotient (FPQuotient) of the desired format or precision.

100.01101110 (base 2) is the same as 4.4296875 (base 10). The full precision answer for 100.8125÷22.75=4.43131868132 (base 10). Higher precision may be achieved by increasing the expansion factor applied to the numerator.

At act S212, the process uses the floating point quotient (FPQuotient) with regard to at least one aspect of system 10. For example, the floating point quotient may be used in: generating preliminary data, which may be used for other mathematical operations; generating data to control pixels displayed on a display (e.g., on user interface 22); the mathematical manipulation of image data (e.g., calculating halftone data from continuous tone data); calculating a velocity (distance/time), such as a velocity of printhead carrier 34 that may be used in printhead carrier velocity control; performing printhead dot count calculations and ink usage determinations for printhead 48 and/or ink tank 50; calculating averages in scanner calibration algorithms (in embodiments where system 10 includes a scanner); etc. Referring to act S116 of FIG. 2A, in essence the floating point quotient is substituted for the integer quotient for use with regards to an aspect of system 10.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for performing a division operation in a system, comprising:
    a) determining an approximate quotient of a numerator value and a denominator value;
    b) determining an initial error of said approximate quotient;
    c) determining a quotient adjustment value based on said initial error;
    d) determining whether to apply said quotient adjustment value to said approximate quotient;
    e) if the determination at d) is YES, then applying said quotient adjustment value to said approximate quotient;
    f) determining an iterative error of said approximate quotient;
    g) updating said quotient adjustment value based on said iterative error;
    h) repeating acts d) through g) until said determination at d) is NO, thereby determining a final value for said approximate quotient;
    i) generating an integer quotient based on said final value of said approximate quotient; and
    j) using said integer quotient with regard to at least one aspect of said system;
    wherein one or more of acts a) through j) is performed by a processor of said system having limited native functions, wherein said system includes said processor used in performing said method, and wherein said processor does not include a native division function, and wherein said processor is an embedded processor resident in an application specific integrated circuit.

2. The method of claim 1, wherein a number of times said updating is performed is greater than or equal to zero.

3. The method of claim 1, wherein said system is an imaging system, and said using said integer quotient is manipulation of image data.

4. The method of claim 1, further comprising performing a floating point division by:
    converting said numerator value into a numerator binary fraction;
    converting said denominator value into a denominator binary fraction;
    expanding a precision of said numerator binary fraction by a predetermined amount to form an expanded numerator binary fraction;
    shifting a decimal position in each of expanded numerator binary fraction and said denominator binary fraction to form a numerator integer and a denominator integer, respectively;
    dividing said numerator integer by said denominator integer using the division process of acts a) through i) to generate said integer quotient;
    converting said integer quotient into a floating point quotient; and
    substituting said floating point quotient for said integer quotient in controlling said at least one aspect of said system.

5. The method of claim 1, wherein using said integer quotient is a determination of a velocity of a movable member of said system.

6. A method for performing a division operation in a system, comprising:
    a) determining an approximate quotient of a numerator value and a denominator value;
    b) determining an initial error of said approximate quotient;
    c) determining a quotient adjustment value based on said initial error;
    d) determining whether to apply said quotient adjustment value to said approximate quotient;
    e) if the determination at d) is YES, then applying said quotient adjustment value to said approximate quotient;
    f) determining an iterative error of said approximate quotient;
    g) updating said quotient adjustment value based on said iterative error;
    h) repeating acts d) through g) until said determination at d) is NO, thereby determining a final value for said approximate quotient;
    i) generating an integer quotient based on said final value of said approximate quotient; and
    j) using said integer quotient with regard to at least one aspect of said system;
    wherein one or more of acts a) through j) is performed by a processor of said system having limited native functions, wherein said system includes said processor used in performing said method, and wherein said processor does not include a native division function, and wherein said system includes a print engine having a printhead carrier, and said using said integer quotient is a determination of a velocity of said printhead carrier.

7. A method for performing division in a system, comprising:
   a) converting a numerator value into a numerator binary fraction;
   b) converting a denominator value into a denominator binary fraction;
   c) expanding a precision of said numerator binary fraction by a predetermined amount to form an expanded numerator binary fraction;
   d) determining an approximate quotient of said expanded numerator binary fraction and said denominator binary fraction;
   e) determining an initial error of said approximate quotient;
   f) determining a quotient adjustment value based on said initial error;
   g) determining whether to apply said quotient adjustment value to said approximate quotient;
   h) if the determination at g) is YES, then applying said quotient adjustment value to said approximate quotient;
   i) determining an iterative error of said approximate quotient;
   j) updating said quotient adjustment value based on said iterative error;
   k) repeating acts g) through j) until said determination at g) is NO, thereby determining a final value for said approximate quotient;
   l) generating an integer quotient based on said final value of said approximate quotient;
   m) converting said integer quotient into a floating point quotient; and
   n) using said floating point quotient with regard to at least one aspect of said system;
   wherein one or more of acts a) through n) is performed by a processor of said system, wherein said system includes said processor used in performing said method that does not include a native division function, and wherein said processor is an embedded processor resident in an application specific integrated circuit.

8. The method of claim 7, wherein a number of times said updating is performed is greater than or equal to zero.

9. The method of claim 7, wherein using said floating point quotient with regard to at least one aspect of said system comprises using said floating point quotient to determine velocity of at least one movable member of said system.

10. The method of claim 7, wherein said system is an imaging system, and said using said floating point quotient is manipulation of image data.

11. A method for performing division in a system, comprising:
   a) converting a numerator value into a numerator binary fraction;
   b) converting a denominator value into a denominator binary fraction;
   c) expanding a precision of said numerator binary fraction by a predetermined amount to form an expanded numerator binary fraction;
   d) determining an approximate quotient of said expanded numerator binary fraction and said denominator binary fraction;
   e) determining an initial error of said approximate quotient;
   f) determining a quotient adjustment value based on said initial error;
   g) determining whether to apply said quotient adjustment value to said approximate quotient;
   h) if the determination at g) is YES, then applying said quotient adjustment value to said approximate quotient;
   i) determining an iterative error of said approximate quotient;
   j) updating said quotient adjustment value based on said iterative error;
   k) repeating acts g) through j) until said determination at g) is NO, thereby determining a final value for said approximate quotient;
   l) generating an integer quotient based on said final value of said approximate quotient;
   m) converting said integer quotient into a floating point quotient; and
   n) using said floating point quotient with regard to at least one aspect of said system;
   wherein one or more of acts a) through n) is performed by a processor of said system, wherein said system includes said processor used in performing said method that does not include a native division function, and wherein said system includes a print engine having a printhead carrier, and said using said floating point quotient is a determination of a velocity of said printhead carrier.

12. An apparatus, comprising a controller configured to receive image data, said controller executing program instructions stored in a non-transitory computer readable storage medium for performing a manipulation of said image data by implementing a division operation including:
   a) determining an approximate quotient of a numerator value and a denominator value;
   b) determining an initial error of said approximate quotient;
   c) determining a quotient adjustment value based on said initial error;
   d) determining whether to apply said quotient adjustment value to said approximate quotient;
   e) if the determination at d) is YES, then applying said quotient adjustment value to said approximate quotient;
   f) determining an iterative error of said approximate quotient;
   g) updating said quotient adjustment value based on said iterative error;
   h) repeating acts d) through g) until said determination at d) is NO, thereby determining a final value for said approximate quotient; and
   i) generating an integer quotient based on said final value of said approximate quotient.

13. The apparatus of claim 12, wherein said controller has a processor used in performing said division, and wherein said processor does not include a native division function.

14. The apparatus of claim 13, wherein said processor is an embedded processor resident in an application specific integrated circuit.

15. The apparatus of claim 12, further comprising performing a floating point division by:
   converting said numerator value into a numerator binary fraction;
   converting said denominator value into a denominator binary fraction;
   expanding a precision of said numerator binary fraction by a predetermined amount to form an expanded numerator binary fraction;
   shifting a decimal position in each of expanded numerator binary fraction and said denominator binary fraction to form a numerator integer and a denominator integer, respectively;

dividing said numerator integer by said denominator integer using the division process of acts a) through i) to generate said integer quotient; and converting said integer quotient into a floating point quotient.

16. The apparatus of claim 12, further comprising:
a printhead carrier carrying at least one printhead;
a drive mechanism for moving said printhead carrier; and
a carrier position encoder configured to generate carrier position data representing a position of said printhead carrier, said controller being communicatively coupled to said carrier position encoder, said controller executing program instructions for performing a determination of velocity of said printhead carrier using said division operation.

17. A method for performing division in a system, comprising:
a) converting a numerator value into a numerator binary fraction;
b) converting a denominator value into a denominator binary fraction;
c) expanding a precision of said numerator binary fraction by a predetermined amount to form an expanded numerator binary fraction;
d) determining an approximate quotient of said expanded numerator binary fraction and said denominator binary fraction;
e) determining an initial error of said approximate quotient;
f) determining a quotient adjustment value based on said initial error;
g) determining whether to apply said quotient adjustment value to said approximate quotient;
h) if the determination at g) is YES, then applying said quotient adjustment value to said approximate quotient;
i) determining an iterative error of said approximate quotient;
j) updating said quotient adjustment value based on said iterative error;
k) repeating acts g) through j) until said determination at g) is NO, thereby determining a final value for said approximate quotient;
l) generating an integer quotient based on said final value of said approximate quotient;
m) converting said integer quotient into a floating point quotient; and
n) using said floating point quotient with regard to at least one aspect of said system;
wherein one or more of acts a) through n) is performed by a processor of said system;
wherein using said floating point quotient with regard to at least one aspect of said system comprises using said floating point quotient to determine velocity of at least one movable member of said system.

18. A method for performing a division operation in a system, comprising:
a) determining an approximate quotient of a numerator value and a denominator value;
b) determining an initial error of said approximate quotient;
c) determining a quotient adjustment value based on said initial error;
d) determining whether to apply said quotient adjustment value to said approximate quotient;
e) if the determination at d) is YES, then applying said quotient adjustment value to said approximate quotient;
f) determining an iterative error of said approximate quotient;
g) updating said quotient adjustment value based on said iterative error;
h) repeating acts d) through g) until said determination at d) is NO, thereby determining a final value for said approximate quotient;
i) generating an integer quotient based on said final value of said approximate quotient; and
j) using said integer quotient with regard to at least one aspect of said system;
wherein one or more of acts a) through j) is performed by a processor of said system having limited native functions, and using said integer quotient is a determination of a velocity of a movable member of said system.

* * * * *